US005325840A

United States Patent [19]

Schohl

[11] Patent Number: 5,325,840

[45] Date of Patent: Jul. 5, 1994

[54] WATCH CRYSTAL CUTTING MACHINE

[76] Inventor: Henry V. Schohl, 208 Barber St., Spring Lake, Mich. 49456

[21] Appl. No.: 973,652

[22] Filed: Nov. 9, 1992

[51] Int. Cl.[5] .......... B23B 3/28; B24B 9/14

[52] U.S. Cl. .......... 125/23.01; 83/879; 83/565; 51/101 R; 51/101 LG; 33/23.08; 33/23.11

[58] Field of Search .......... 125/23.01, 23.02; 65/174; 83/565, 879, 880, 881, 582; 51/100 R, 101 R, 101 LG; 33/18.1, 23.08, 23.11, 638

[56] References Cited

U.S. PATENT DOCUMENTS

| | | | |
|---|---|---|---|
| 2,421,065 | 5/1947 | Hoffer | 51/101 LG |
| 3,435,563 | 4/1969 | Reaser | 51/101 R |
| 3,673,742 | 7/1972 | Colbaugh | 51/101 R |
| 4,000,766 | 1/1977 | Sutcliffe | 51/101 R |

FOREIGN PATENT DOCUMENTS

| | | | |
|---|---|---|---|
| 619326 | 7/1978 | U.S.S.R. | 51/101 R |
| 622951 | 5/1949 | United Kingdom | 51/100 R |

*Primary Examiner*—Jack Lavinder

*Attorney, Agent, or Firm*—Price, Heneveld, Cooper, DeWitt & Litton

[57] ABSTRACT

A pattern holding assembly and a crystal material holding assembly are paired on opposed ends of a shaft passing transversely through a base unit such that the pattern and the crystal material are simultaneously rotated with a driven shaft through 360 degrees of angle, or multiples thereof, by an exterior drive mechanism. A second shaft, directed through the base unit to be parallel to the first axis, and to pivot about its longitudinal axis, is adapted to carry a stylus bit for tracing the pattern and a cutter bit for scribing the pattern onto the crystal material. The two shafts are offset sufficiently to enable rotation of the second shaft to completely follow the pattern, the stylus and the cutter bit being continuously in transverse alignment. Provision is made for holding and releasing both the pattern and for the crystal material, and for translating the stylus and cutter shaft longitudinally to enable engagement of the stylus into the pattern, and then for engaging the cutter bit onto the crystal material with an appropriate inscribing pressure.

20 Claims, 6 Drawing Sheets

WATCH CRYSTAL CUTTING MACHINE

BACKGROUND OF THE INVENTION

1. Field of the Invention:

The present invention relates to devices for cutting mineral glass crystal material. In particular, this invention relates to a device for holding a watch crystal bezel pattern and a piece of mineral glass crystal stock, and for mechanically inscribing the bezel pattern onto the mineral glass crystal material blank so that a bezel shaped mineral glass crystal may be broken from the mineral glass crystal stock material.

2. Description of the Prior Art:

Bezel-shaped mineral glass crystals, primarily for replacement into wrist watches and the like, have long been formed from mineral glass crystal stock blanks, of a variety of materials, including plastics, by inscribing the stock with, typically, a diamond point or scribe, with repeated scribing, followed by snapping along or machining to the inscribed mark, resulting in a rough bezel-shaped mineral glass crystal, which is then ground on appropriate edges to a final size and shape. The only alternatives to the above process have been to grind the edges of a mineral glass crystal blank from the raw blank to a final shape and size, or to order a replacement mineral glass crystal from the watch manufacturer.

While the device of the present invention does not appear to be related to heretofore known devices discussed hereinabove, it may appear that devices specifically adapted to other purposes, other than forming replacement bezel-shaped watch mineral glass crystals, may have relation to the present invention. For example, the common pantograph provides for following a pattern with a first stylus, with a second stylus tracing an enlarged, equal, or reduced image of the pattern traced.

Also related, at least in part, are the known mechanical devices developed to form duplicate keys for multiple tumbler locks. Such devices typically provide a driven rotating, thin cross-section grinding wheel. The key to be duplicated is placed into a holder such the it extends parallel to the axis of rotation of the grinding wheel. A key blank is placed into a second holding device, also parallel to the axis of rotation of the grinding wheel, such that the longitudinal directions of the original key and the key blank are the same and that any longitudinal grooves are substantially aligned. Both holding devices are rigidly coupled to a shaft, extending parallel to the axis of rotation of the grinding wheel, the shaft being capable of being pivoted about its longitudinal axis and translated longitudinally therealong. As the shaft is pivoted, the original key is brought into contact with a fixed stylus while the blank key is ground equivalently by the grinding wheel. Translation of the shaft along its longitudinal extent enables all tumbler notches of the original key to be ground into the blank key, forming a substantially exact duplicate key.

SUMMARY OF THE INVENTION

Accordingly, it is an object of the present invention to provide a device capable of holding a blank of mineral glass crystal stock material and a watch bezel border, in separate holders, such that a tracing stylus, mechanically operated to follow the shape of the watch bezel border, causes a gravity coupled inscribing stylus to inscribe the pattern of the watch bezel border onto the blank of mineral glass crystal stock material.

It is another object of the present invention to provide a device having a tracing stylus that is spring biased to maintain tracing contact with the watch bezel border.

It is an additional object of the present invention to provide a device having an inscribing stylus that is spring biased to provide a substantially uniform and controlled inscribing force onto the surface of a blank of mineral glass crystal stock material throughout, under gravity, one or more pattern tracing cycle.

It is a further object of the present invention to provide a device capable of enlarging or reducing the pattern inscribed onto the blank of mineral glass crystal stock material relative to the size of the watch bezel border being traced.

Another object of the present invention is to provide a mechanism driving the tracing stylus around the watch bezel border, and for concurrently driving the inscribing stylus in the appropriate pattern onto the blank of mineral glass crystal stock material.

An additional object of the present invention is to provide a mechanism capable of being motorized to concurrently drive a bezel pattern holding assembly and a mineral glass crystal blank holding assembly throughout one or more pattern tracing cycle.

These, and other objects, features, and advantages of the present invention that may become evident through the following descriptions and claims, taken in association with the accompanying drawings, are provided by a mechanism comprised of a base assembly, a tracing and inscribing stylus assembly, a mineral glass crystal clamp assembly, a pattern clamp cam and wheel assembly, and a drive assembly. The base assembly consists of a substantially massive base unit resting on and coupled to a pair of parallelly disposed leveller bars, each of which is provided with at least two adjustable height legs exterior to a width of the base unit. The base unit is also provided with a depth, from a front surface thereof to rearmost edges of sides thereof, and a height. The interior of the base unit is substantially unoccupied except for a vertical strength member disposed parallel to the front surface proximately rearward of half the depth of the base unit. Each side is formed to include transversely mutually registering stylus assembly shaft journals, proximate to uppermost, rearmost corners of the sides, and transversely mutually registering pattern and mineral glass crystal holder shaft journals, proximate to the uppermost edges of the base unit and substantially midway between the front surface of the base unit and the parallel strengthening member of the base unit. A further pair of journalled holes are formed through the front surface and through the strengthening member so as to be at a common height, and substantially bisecting the width of the base unit.

This last pair of journalled holes are adapted to accept a drive shaft of the drive assembly, which is formed or fabricated to include a worm gear partially along its extent between the front surface and the strengthening member of the base unit. The drive shaft has an extent to extend outwardly from the front surface of the base unit. A crank wheel assembly is coupled to the distal end of the drive shaft to drive rotation of the drive shaft and worm gear. In an alternate embodiment, the drive shaft may be powered by a motor, disposed either externally of or within the base unit.

A second shaft, part of the pattern and mineral glass crystal holding assembly, passes through the second pair of the above-described journal holes, to extend outwardly from each side of the base unit. A holding shaft turn wheel gear is rigidly coupled to the holding shaft, between the sides of the base unit, so as to rotate therewith about the longitudinal axis of the holding shaft. The turn wheel gear is disposed to operably mate with the worm gear of the drive shaft. A first end of the holding shaft, extending outwardly from a first side of the base unit, is rigidly coupled to the pattern holding clamp cam and wheel assembly such that the pattern holding clamp cam and wheel assembly rotates with the holding shaft about the longitudinal axis of the holding shaft. A second end of the holding shaft, opposed to said first end and extending outwardly from the opposite side of the base unit, is rigidly coupled to the crystal clamp assembly such that the crystal clamp assembly also rotates about the longitudinal axis of the holding shaft, in unison with the pattern holding clamp cam and wheel assembly.

A third shaft passes transversely through the base unit to be journalled through the first pair of above-discussed journalled holes in the base unit to extend outwardly from each side of the base unit. The opposed ends of the third shaft have, respectively, a tracing stylus assembly and an inscribing stylus assembly coupled thereto so as to rotate with said third shaft about the longitudinal axis of said third shaft. In general, the tracing stylus and the inscribing stylus are arranged to pivot in transverse registration across the base unit.

The crystal clamp assembly consists of a generally circular base member adapted to be coupled to the appropriate end of the holding shaft by a set screw. Three tapered studs are passed through the base member to extend outwardly from the base unit. The studs are tapered inwardly from a maximum diameter at their most outward extent. The three studs are arranged on the base member at equal radii to form an equilateral triangle. Two of the studs are rigidly coupled to the base member, while the third stud is provided with a spring biased plunger allowing this stud to be extended further outwardly from the base member, against the spring bias, so that a blank of mineral glass crystal stock material may be held between the several studs and against the surface of the base member. The surface of the base member is further provided with a pair of opposed notches to enable finger grasping of the mineral glass crystal material during insertion and removal to and from the crystal clamp assembly.

The opposed end of the holding shaft, extending outwardly from the base unit, serves as a rotating support for the pattern holding cam and clamp assembly. The clamp cam member, a substantially circular plate formed to have a pair of opposed arcuate slots to separate and close pattern clamps on rotation of the clamp cam by a manual lever attached thereto, the clamp cam revolving about the holding shaft. A pair of clamp guide elements, respectively engaged with a corresponding one of the arcuate notches of the clamp cam member, and diametrically translatably with diametric guide grooves on a surface of a pattern holding wheel coupled to the holding shaft so as to rotate therewith, serve to open and close a correspondingly opposed pair of pattern clamp members adapted to move with the corresponding clamp guide elements. The pattern clamp members are formed to have dihedral jaws to hold the pattern. The pattern clamp guide elements are spring biased in favor of a closed position wherein the dihedral jaws are most closed together to clamp the pattern therebetween.

A stylus arm for holding a tracing stylus bit is rigidly coupled, proximate to a first end of the stylus arm, to a first end of the above-discussed third shaft corresponding to the pattern clamp end of the second shaft. The opposed, distal end of the stylus arm is adapted to accept and hold a tracking stylus bit extending in a direction parallel to the third axis and inwardly toward the corresponding proximate side of the base unit, the stylus bit having an extent sufficient to engage with, and follow under gravity, the pattern as it rotates with the second shaft under mechanical drive from the drive mechanism and gears. Minor adjustments may be made in the separation between the axis of the third shaft and the axis of the stylus bit by compression or relaxation of a tension notch formed partially through the stylus arm in a diagonal manner.

A cutter arm is rigidly depended from the obverse end of the above-discussed third shaft so as to extend from the third shaft, parallel to the extent of the stylus arm, to an L-shaped extension segment extending outwardly from the base unit. The L-shaped extension segment has a circular hole formed fully along its extent toward the base unit, with a slot formed in one side of the L-shaped extension segment, from the distal end thereof to a point proximate to the juncture of the L-shaped extension segment with the cutter arm. A cutting stylus holder is adapted to translate longitudinally along the hole in the L-shaped extension segment. The cutting stylus holder is provided with a transverse handle member, adapted to translate along said slot. The end of the cutting stylus holder is adapted to hold a crystal cutting stylus bit as a linear axial extension thereof, directed toward the side of the base unit incorporating the crystal clamp assembly. The cutting stylus holder is spring biased toward the side of the base unit. The distal end of the L-shaped extension segment is further formed to include a short transverse notch, at substantially 90 degrees of angle to the longer slot, to accept and hold the transverse handle member against the spring bias force, to maintain the crystal cutting bit in a position out of contact with the surface of the mineral glass crystal blank and disposed outwardly from the base unit.

The third shaft, described earlier, is further adapted to be capable of translating longitudinally along its axis through the journals of the base unit and through a circular cylindrical spacer disposed between the sides of the base unit. A thumbscrew is provided to lock the third shaft at a desired longitudinal position.

In operation, the third shaft first assumes, under gravity, a rotational attitude wherein the pattern tracing stylus arm and the cutter stylus arm are both substantially vertical, and the cutter stylus holder is held in its outward position against its spring bias. A desired pattern is placed into the pattern holder assembly, to be secured therein by the corresponding spring biases. An appropriately sized plate of mineral glass crystal stock material is then placed onto the crystal holder assembly, between two of the tapered studs, so as to be held by the third tapered stud when its spring biasing plunger is released. With the thumbscrew of the third shaft loosened, the third shaft is longitudinally translated toward the pattern clamp assembly side of the base unit until the pattern tracing stylus clears the pattern clamp assembly and the attached pattern. The third shaft is then pivoted about its longitudinal axis so that the tracing stylus is within the area of the pattern. The third shaft is then translated longitudinally toward the crystal clamp side of the base unit until the tracing stylus appropriately engages the pattern under gravity. The thumbscrew is then tightened to preclude further longitudinal translation of the third shaft, and the handle of the cutter holder is placed into the longer slot of the L-shaped segment, allowing the crystal cutting stylus to engage, under its spring bias, with the surface of the mineral glass crystal material. The drive wheel is then rotated, causing the gears to rotate the second shaft such that the tracing stylus follows the periphery of the pattern, under gravity, while the cutting stylus inscribes an image of the pattern onto the mineral glass crystal material.

Once the pattern has been fully inscribed onto the mineral glass crystal material, the procedure for installing the mineral glass crystal material and the pattern is reversed, and the surplus mineral glass crystal material is broken off the inscribed image of the pattern on the mineral glass crystal blank, in the manner of glass cutting. Any rough edges on the mineral glass crystal thus formed may be smoothed by emery paper.

BRIEF DESCRIPTION OF THE DRAWING

In the drawing, wherein like reference numerals and symbols are used to refer to like elements and features throughout.

DESCRIPTION OF THE PREFERRED EMBODIMENTS

Figure 1:
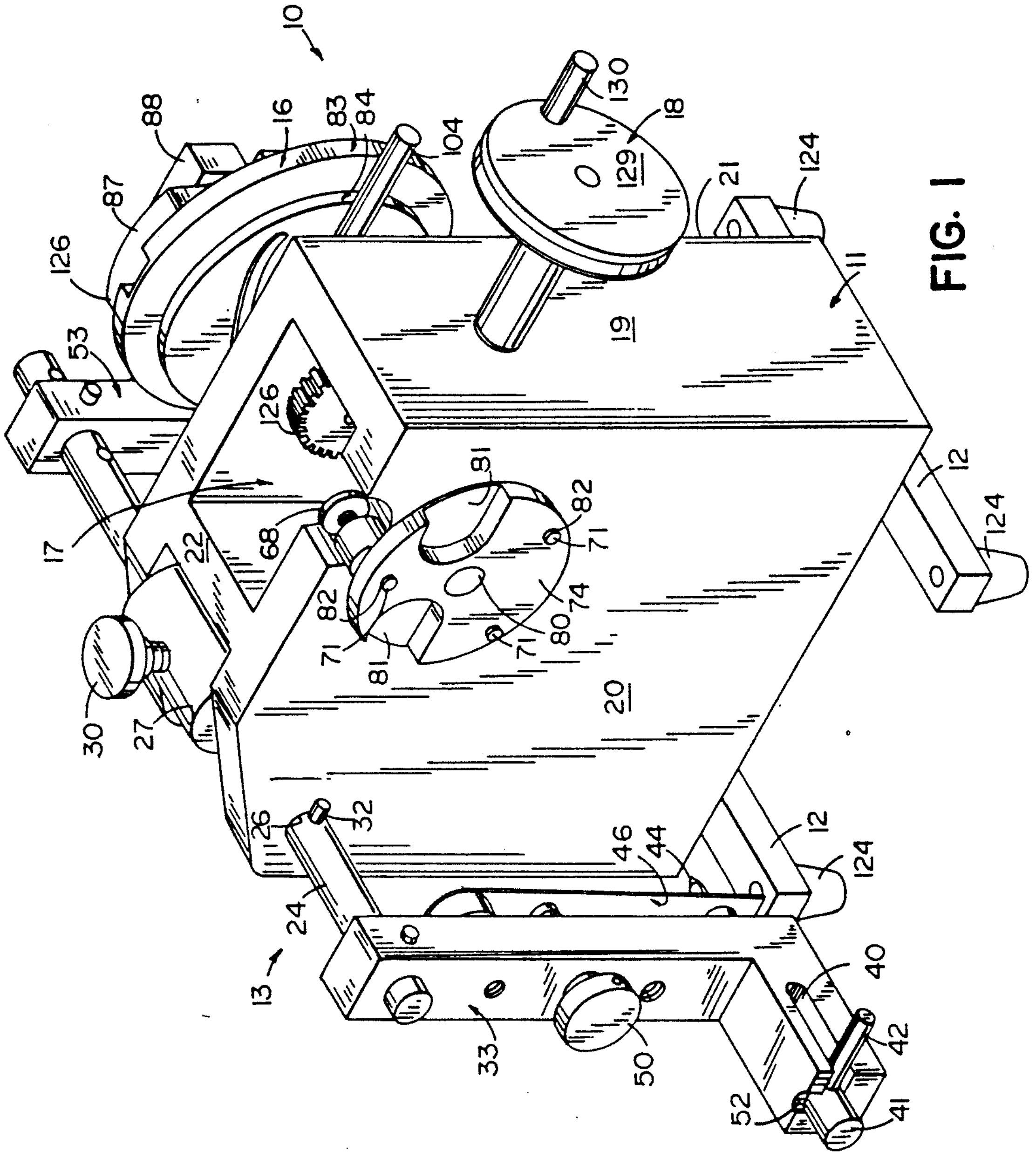
FIG. 1 is a perspective view, taken from a left front upper aspect, of a watch mineral glass crystal cutting machine in accordance with the present invention.

Referring first to FIG. 1, a watch crystal cutting machine in accordance with the present invention is indicated generally at 10. The crystal cutting machine 10 is shown to consist of a base unit 11 supported on a pair of leveller bars 12, a tracing and scribing mechanism, shown, in a disengaged position, generally at 13, a mineral glass crystal material holding assembly 14, a pattern holding assembly 16, an internal portion of a drive mechanism 17, and an external portion 18 of the drive mechanism 17. The base unit 11 is formed as a relatively massive structure having a front vertical surface member 19, a left vertical surface member 20, a right vertical surface member 21, and an intermediate vertical structural strengthening member 22. The massiveness of the base unit 11 is required to provide stability for the crystal cutter 10 during operation thereof.

Figure 2:
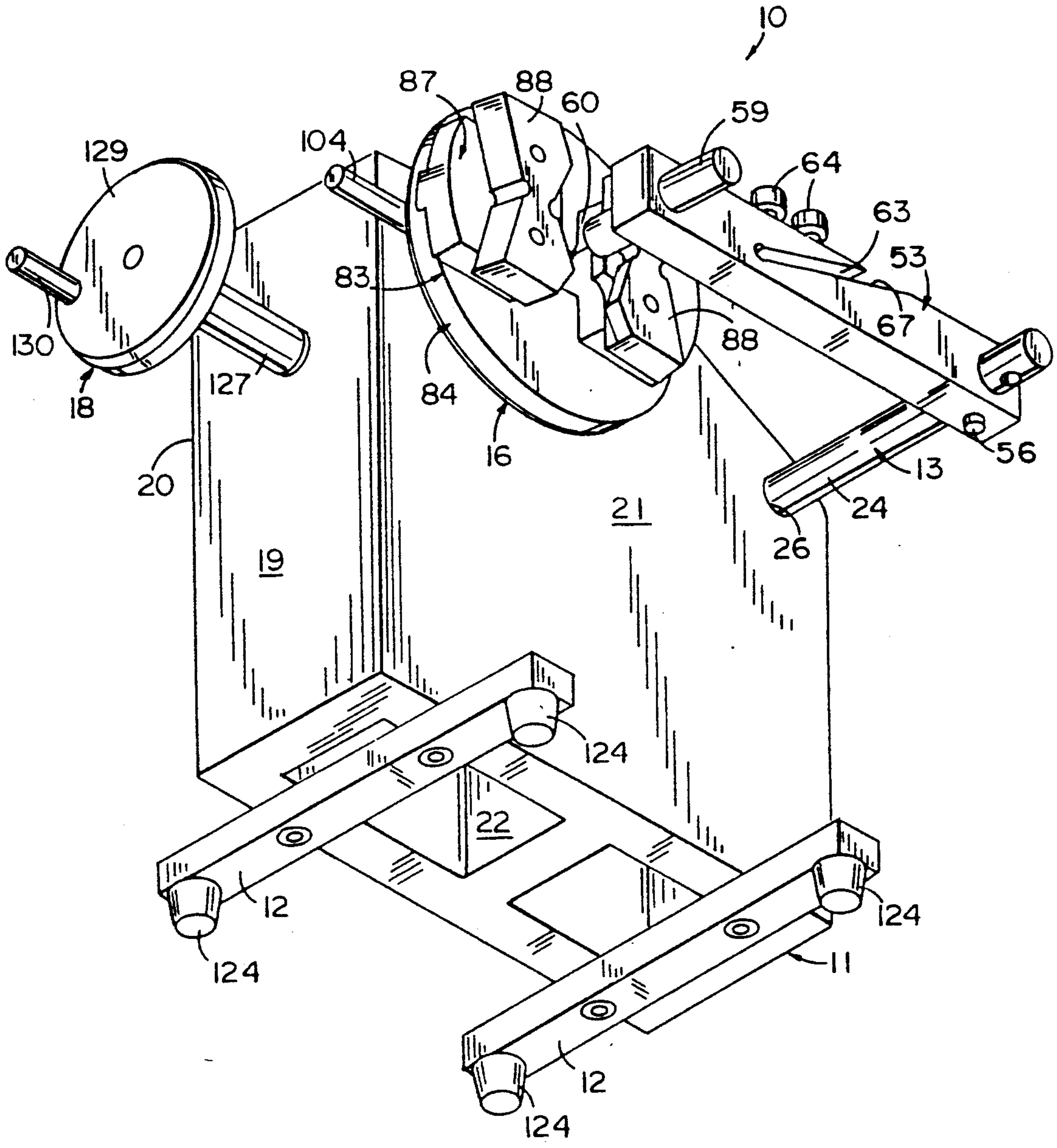
FIG. 2 is a perspective view, taken from a right front lower aspect, of a watch mineral glass crystal cutting machine in accordance with the present invention.

Referring next to FIG. 2, a reverse perspective of the crystal cutting machine 10, shows that the pair of leveller bars 12 are affixed to the base unit 11 in a mutually parallel, spaced apart arrangement, to be transverse to the width of the base unit 11, with the spacing being such that the leveller bars 12 are respectively proximate to the front surface 19 and rearmost edges of the left and right sides, 20 and 21, of the base unit 11. In the view of FIG. 2, the tracing and inscribing mechanism 13 is shown in an operative position, pivoted from the position shown in FIG. 1, such that a tracing stylus 23 engages, under gravity, a pattern (not illustrated).

Figures 3, 4:
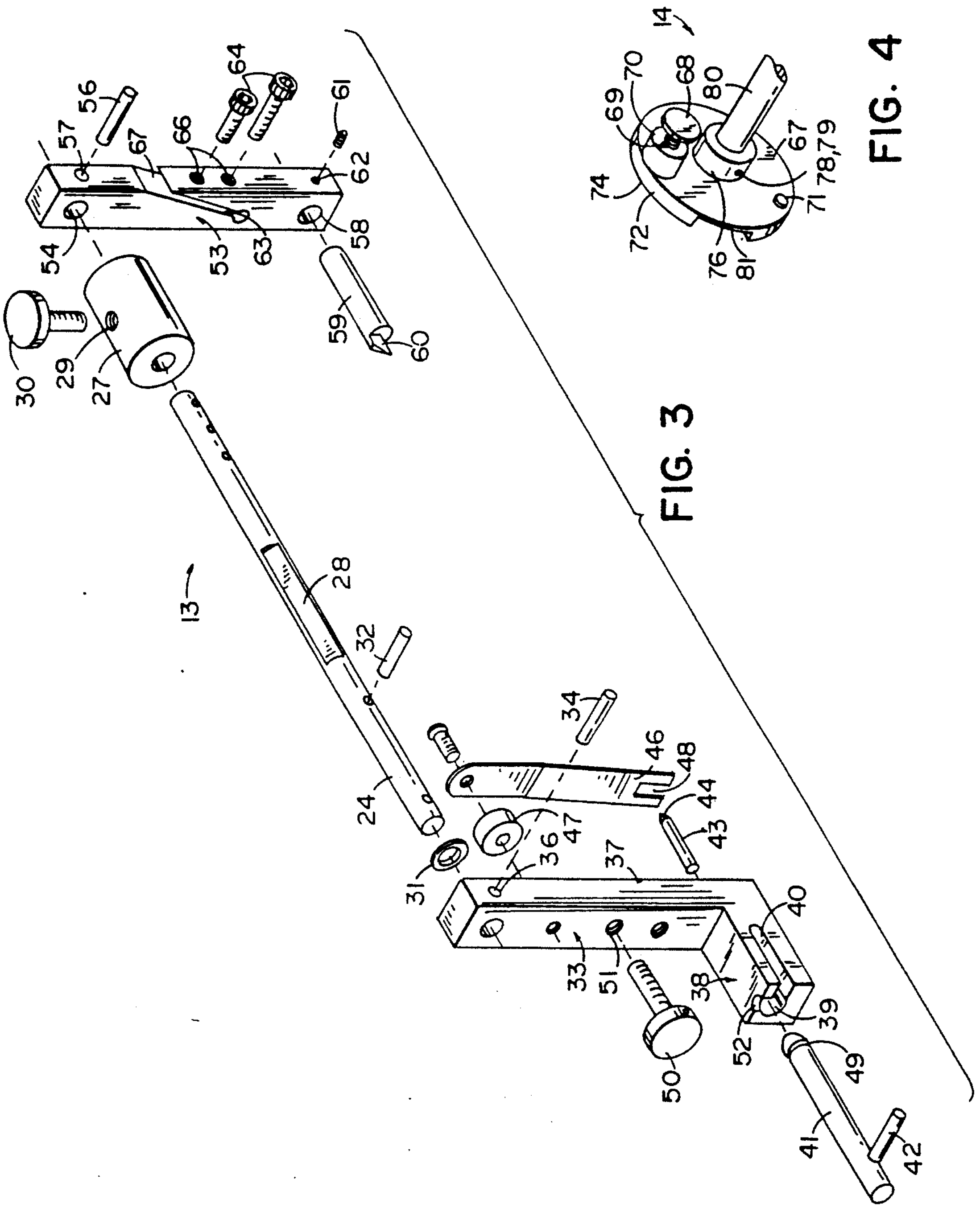
FIG. 3 is an exploded perspective view, taken in the perspective of FIG. 1, of a stylus holding shaft and assembly in accordance with the present invention.
FIG. 4 is a perspective view, illustrating the backside of a crystal material clamp assembly in accordance with the present invention.

Referring next to FIG. 3, the tracing and scribing mechanism 13 of the crystal cutting machine 10 is shown in exploded view to illustrate the several components thereof, and their interrelationships. A cutter/stylus shaft 24 is adapted to extend transversely with respect to the base unit 11 so as to be journalled through the left vertical surface member 20 and the right vertical surface member 21 of the base unit 11 through holes 26 formed in mutual transverse registration proximate to upper rear corners of said sides 20 and 21. The cutter/stylus shaft 24 has further extent outwardly from both said sides 20 and 21 of the base unit 11. A shaft spacer element 27, formed substantially as a right circular cylinder having an axial length shorter than the interior spacing between the left vertical side surface member 20 and the right vertical side surface member 21, the cutter/stylus shaft 24 passing axially through the shaft spacer 27, such that the shaft spacer 27 is disposed between said sides 20 and 21 and approximately midway of the extent of the cutter/stylus shaft 24, the cutter/stylus shaft 24 freely translating longitudinally through the shaft spacer 27. The cutter/stylus shaft 24 is formed to have a longitudinally extended flattened surface region 28. Substantially midway of the longitudinal extent of the shaft spacer 27, a threaded radial hole 29 is formed therethrough to accept a first thumbscrew 30, a distal end of which engages onto the flattened surface 28 to lock the cutter/stylus shaft 24 in a desired longitudinal position with respect to the shaft spacer 27. Generally disposed along the cutter/stylus shaft 24, from the shaft spacer 27 toward the side of the base unit 11 containing the crystal material holding assembly 14 of FIG. 1, are, sequentially, a shaft stop washer 31 and a metal tension peg 32, the latter passing diametrically through the cutter/stylus shaft 24 to extend diametrically therefrom so as to hold the shaft stop washer 31 between the metal tension peg 32 and the shaft spacer 27. The shaft spacer 27, the shaft stop washer 31, and the metal tension peg 32 cooperatively function to permit limited longitudinal translation of the cutter/stylus shaft 24 when the first thumbscrew 30 is loosened to be disengaged from the flattened surface 28 of the cutter/stylus shaft 24. A longitudinally desired translational position of the cutter/stylus shaft 24 being maintained by tightening the first thumbscrew 30 against the flattened surface 28 of the cutter/stylus shaft 24.

Proximate to the distal end of the cutter/stylus shaft 24 extending outwardly from the side of the base unit 11 containing the crystal material holding assembly 14, a cutter arm 33 is affixed thereto, typically by a first set screw 34 engaged into a threaded hole 36 formed in the cutter arm 33, so as to rotate with the cutter/stylus shaft 24 about the longitudinal axis of the cutter/stylus shaft 24. The cutter arm 33 is formed to have a substantially L-shape, consisting of a leg segment 37, depending from the cutter/stylus shaft 24 through a distance appropriate to bring the distal end of the leg segment 37 within the area formed by the crystal material holding assembly 14 (FIG. 1), and an arm segment 38, extending outwardly, relative to the base unit 11, from the distal end of the leg segment 37. The arm segment 38 is formed to have a central hole 39 throughout its length, the hole 39 being substantially perpendicular to the corresponding side of the base unit 11. A portion of the extent of the central hole 39, originating at the distal end of the arm segment 38, includes a radial slot 40 through the longitudinal exterior of the arm segment 38. A cutter holding shaft 41, having a handle member 42 radially extending from the cutter holding shaft 41 proximate to a first end thereof, is adapted to be axially freely translatable along the hole 39 through the arm segment 38, while the handle member 42 translates along the slot 40 of the arm segment 38. The end of the cutter holding shaft 41 obverse to the end having the handle member 42 affixed thereto, that is, the end of the cutter holding shaft 41 most proximate to the corresponding side of the base unit 11, is adapted to axially accept and hold a cutter bit 43 having, typically, a diamond point 44 for inscribing onto mineral glass crystal stock material.

Compressive force substantially uniformly holding the diamond point 44 against a surface of the mineral glass crystal material (not illustrated) is provided by a leaf spring element 46 coupled, by a stand-off member 47 disposed at a first end of the leaf spring element 46, to a surface of the leg segment 37 of the cutter arm 33 disposed to be between said leg segment 37 and the corresponding side surface of the base unit 11. The observe end of the leaf spring element 46 is formed to have a generally V-shaped notch 48 engaging a radially enlarged juncture 49 of the cutter holding shaft 41 with the cutter bit 43 so as to tend to hold the diamond point 44 in a direction of withdrawal from engagement with the mineral glass crystal material. Added inscribing force may be applied to the diamond point 44 by advancing a second thumbscrew 50 through a hole 51 through the leg segment 37 of the cutter arm 33, approximately mid-way of its extent, and into contact with the leaf spring element 46. Reduction of the inscribing force is accomplished by withdrawing the second thumbscrew 50 partially to allow the leaf spring element 46 to relax. The distal end of the arm segment 38 of the cutter arm 33 is further formed to have a short notch 52 from the central hole 39 at substantially 90 degrees of angle with respect to the radial notch 40, said short notch 52 being adapted to hold the handle member 42 proximate to the distal end of the arm segment 38, such that the cutter holding shaft 41 is substantially in its most outwardly disposed position.

A stylus arm 53 depends from the cutter/stylus shaft 24 passing through a hole 54 at a first end of the stylus arm 53, and is typically coupled thereto by a second set screw 56 passing through a threaded hole 57 formed through the stylus arm 53 to engage against the surface of the cutter/stylus shaft 24, said stylus arm 53 being disposed proximate to the distal end of the cutter/stylus shaft 24 extending outwardly from the base unit 11 on the side supporting the pattern holding assembly 16 (FIG. 1). A hole 58 is formed through the distal end of the stylus arm 53 to be parallel with the hole 54 formed through the first end of the stylus arm 53. A stylus bit 59, having a stylus point 60 on a first longitudinal end thereof, directed toward said pattern holding assembly 17, is held within the hole 58, by a third set screw 61 passing into a threaded hole 62 to engage the surface of the stylus bit 59. The extent of the stylus arm 53 is such that the separation between the longitudinal axes of the cutter/stylus shaft 24 and the stylus bit 59 places the stylus point 60 within the pattern area (not illustrated) when the stylus arm 53 is at an appropriate rotational position about the axis of the cutter/stylus shaft 24, as shown in FIG. 2. The depending extent of the leg segment 37 of the cutter arm 33 and that of the stylus arm 53 are required to be substantially parallel and of substantially equal length.

The stylus arm 53 is further formed to include a diagonal notch 63 parallel to the stylus bit 59. A pair of cap screws 64, engaged into a corresponding pair of threaded holes 66 to but against an obverse surface 67 of the diagonal notch 63 provide means for making minor adjustment in the separation between the cutter/stylus shaft 24 and the stylus bit 59.

The tracing and scribing mechanism 13 is intended to have the cutter/stylus shaft 24 rotate within the journalled holes 26, with the cutter arm 33 and the tracing stylus arm 53 pivoting in concert therewith, generally under gravity acting on the distal ends of the cutter arm 33 and the stylus arm 53.

Figures 4A, 5:
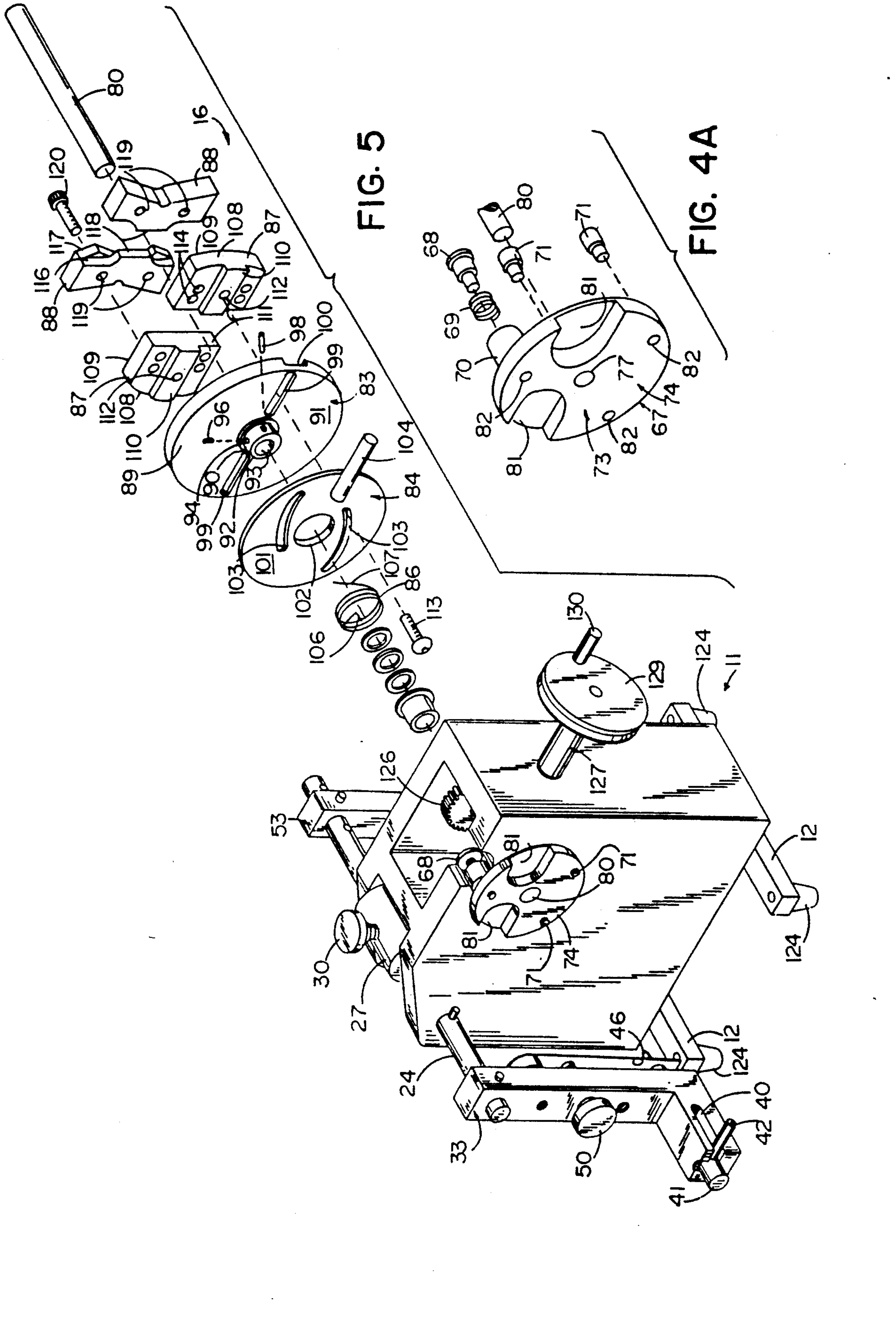
FIG. 4*a* is an exploded perspective view, taken in the perspective of FIG. 1, of the crystal material clamp assembly in accordance with the present invention.
FIG. 5 is an exploded perspective view, taken in the perspective of FIG. 2, of a pattern holding clamp assembly in accordance with the present invention.

Referring next to FIGS. 4 and 4A, the crystal material holding assembly 14 consists of a crystal clamp plate and collar 67, a plunger 68, a compression spring 69, a spring and plunger housing 70, and a pair of inversely tapered studs 71. The crystal clamp plate and collar 67 is formed from a substantially circular, planar plate element 72, a central region 73 of a first surface 74 thereof is slightly indented to preclude adherance of the mineral glass crystal material (not illustrated) thereto. A collar 76 is rigidly affixed to an axial position on the obverse surface of the plate element 73. A central axial hole 77 is formed through the plate element 72 and the collar 76. The collar 76 is formed to have a radial threaded hole 78 adapted to accept a fourth set screw 79 locking the crystal material holding assembly 14 to a distal end of a driven shaft 80, to be described further below. The first surface 74 of plate element 72 is further formed to include an opposed pair of finger notches 81. Three stud holes 82 are formed through the plate element 72 perpendicular to the first surface 74. The three stud holes 82 form an equilateral triangle at a radius on the front surface 74 proximate to the maximum radius of the plate element 72. Two of the stud holes 82 are occupied by the pair of tapered studs 71, which are rigidly affixed in said holes 82 so that said studs 71 have an increasing diameter outwardly from said first surface 74, and outwardly with respect to said base unit 11. The third stud hole 82 has the spring and plunger housing 70 affixed to the obverse surface of the plate element 72 in a manner such that the plunger 68, having a distal end formed substantially like the tapered studs 71, passes through the compression spring 69, the spring and plunger housing 70, and the remaining stud hole 82 through the plate element 72. Without force being applied to the plunger 68, the compression spring 69 provides a bias tending to hold the stud shaped distal end of the plunger 68 at the same outward distance as the other two studs 71. Adding force to the plunger 68 causes the distal end of the plunger 68 to translate further outwardly from the first surface 74, providing a greater separation between the tapered studs 71 for insertion or removal of the mineral glass crystal material.

Referring next to FIG. 5, the pattern holding assembly 16 is shown, in exploded view, to be comprised of a clamp wheel 83, a clamp cam 84, a clamp spring 86, a pair of clamp guides 87, a pair of pattern clamp jaws 88, and miscellaneous assembly screws to be identified hereinbelow. The clamp wheel 83 is formed substantially as a planar circular plate element 89 having a concentric circular first collar flange 90 rigidly formed or attached centrally on a first surface 91 of the plate element 89, with a second, lesser diameter, concentric circular collar 92 rigidly formed or attached centrally to the first collar flange 90. A concentric central hole 93 is formed through the circular plate element 89, the concentric circular first collar flange 90, and the second concentric circular collar 92, said hole 93 being adapted to accept an outwardly extending portion of a driven shaft to be described below, said outwardly extending portion being on the side of the base unit 11 (FIG. 2) used for pattern tracing. A radial threaded hole 94 is formed in the second collar 92 to accept a fifth set screw 96 for rotationally clamping the plate element 89 to said driven shaft 80. A second radial hole 97, disposed proximate to a distal end of the second collar 92, frictionally accepts and holds a short rod-like spring stop element 98, which will become functionally clarified below. The plate element 89 is further formed to include a diametrically opposed, radially directed, pair of slots 99 fully through the thickness of the plate element 89, each extending from the outer diameter of the second collar 92 to ends of slots 99 proximate to, but within, the diameter of the plate element 89. The obverse surface of the plate element 89 is formed to have a wide diametric guide notch 100 fully across the plate element 89.

The clamp cam 84 is formed generally as a circular cam plate member 101 formed to have an axial hole 102 therethrough adapted to rotatably seat on the first collar flange 90 of the plate element 89, with the driven shaft 80 also passing therethrough. The clamp cam 84 is further includes a pair of arcuate eccentric slots 103 formed therethrough, the pair of arcuate slots 103 being diametrically opposed with respect to the axial hole 102. A rotation handle member 104 is rigidly attached to a surface of the cam plate member 101, to extend radially outwardly from the diameter of the cam plate member 101, said surface of attachment being that surface of the cam plate member 101 opposite that disposed adjacent to the plate element 89.

The clamp spring 86 is configured as a circularly wound torsion spring adapted to freely rotate about the second collar 92 of the plate element 89, between the clamp cam 84 and the base unit 11. A first end of the circularly wound clamp spring 86 is provided with an axially directed extension 106 adapted to engage with the stop element 98 of the second collar 92 of the plate element 89. The other end of the circularly wound clamp spring 86 is formed as a generally radial directed extension 107 which engages the handle 104 affixed to the clamp cam 84.

The pair of clamp guides 87 are each formed from a generally rectangular stock, a first end 108 of which is shaped as an arc. The thickness of each clamp guide 87 is bounded by a planar first surface 109, the obverse surface having a flange 110 formed thereon extending from the center of the arc on the first end 108 to the central region of the obverse end 111 of the corresponding clamp guide 87. Substantially midway between the first end 108 and the obverse end 111 of each clamp guide 87, a threaded hole 112 is formed perpendicularly through the clamp guide 87 and the flange 110. The flange 110 is adapted to slidably translate along the diametric guide notch 100 of the clamp wheel 83, being held therealong by a threaded screw 113 passing through the corresponding arcuate slot 103 of the clamp cam 84 and the corresponding slot 99 of the clamp wheel 83 to engage with the threaded hole 112 of the corresponding clamp guide 87. Additional threaded holes 114 are formed through each clamp guide 87, to be parallel with the hole 112, and disposed to be on either side of the flange 110. The purpose of the holes 114 will be clarified hereinbelow.

The pair of pattern clamp jaws 88 is provided with a complex shape which can be somewhat simplified by considering the thickness of each clamp jaw 88 to be substantially bisected into a first substantially planar portion 116 and a second substantially planar portion 117. The first planar portion 116 is formed to have a stop region 118, which, when the crystal cutting machine 10 is assembled, is directed toward the stop region 118, of the other pattern clamp jaw 88. An edge of the first portion 116, opposite the edge having the stop region 118, is formed as a shallow V-shape, opening away from the stop region 118. The second portion 117 is formed to have a shallow V-shape, opening away from the corresponding first portion 116 and generally corresponding therewith as an extension of said edge. The obverse edge of the second portion 117 is formed as an outwardly narrowing V-shape, with a centrally disposed inwardly narrowing V-shape. Both edges are generally beveled outwardly from the first portion 116 to the second portion 117. A pair of holes 119 are formed through the thickness of each pattern clamp jaw 88, disposed to be substantially equidistant from the vertices of the V-shaped edges. The holes 119 are adapted to each accept a cap screw 120 which engages with a correspondingly registering threaded hole 114 of the corresponding clamp guide.

Figure 6:
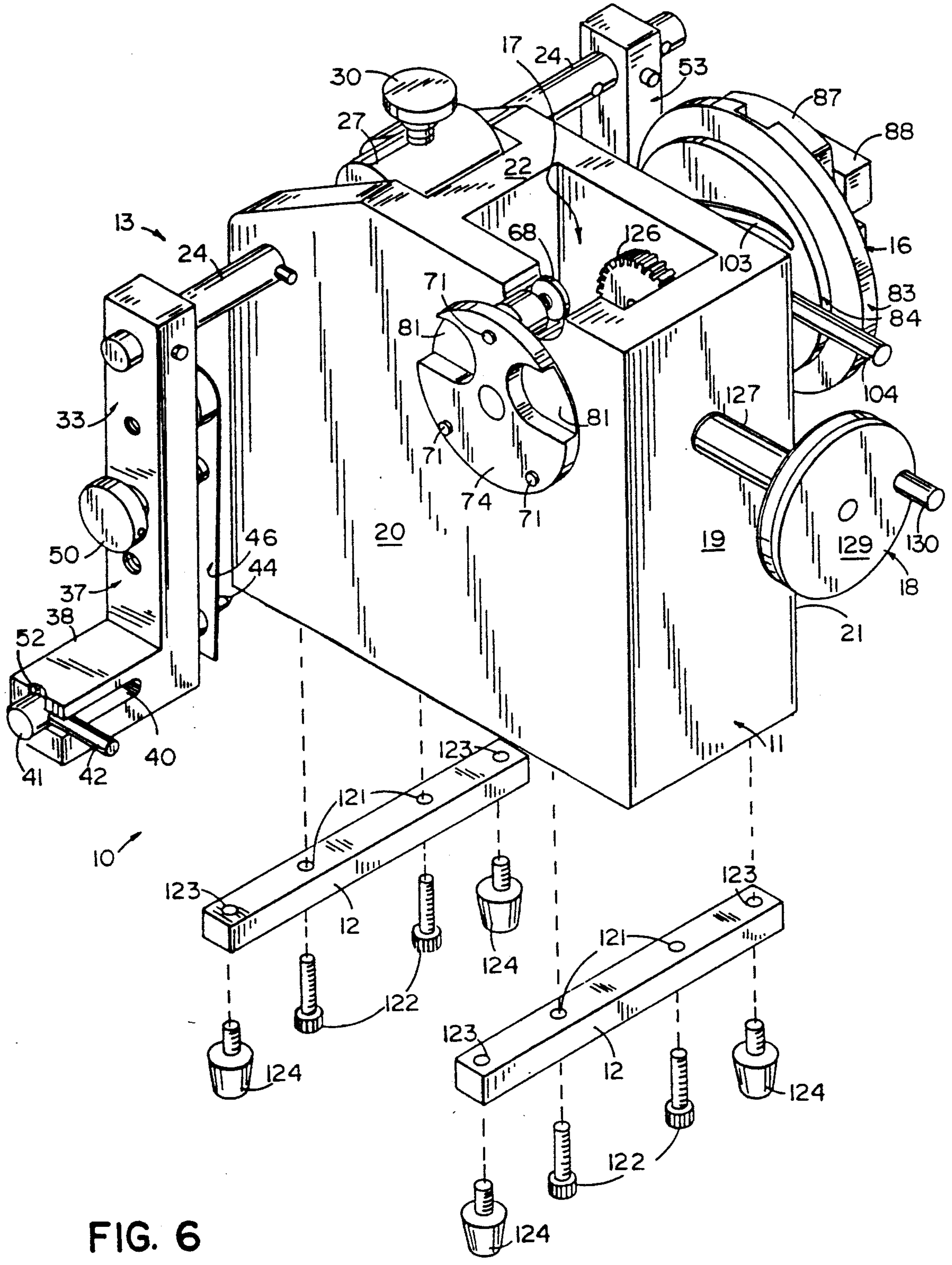
FIG. 6 is an exploded perspective view, taken in the perspective of FIG. 2, of base unit levelling bar assemblies in accordance with the present invention.

Referring next to FIG. 6, the leveller bars 12 are illustrated in exploded view in relation to their respective attachments to the base unit 11. Each leveller bar 12 is configured as a generally rectangular length of bar stock having an extent to span the separation between the left vertical surface member 20 and the right vertical surface member 21 of the base unit 11, and to extend equidistantly outwardly from each side thereof to serve as outrigger supports for the base unit 11. Each leveller bar 12 is provided with a first pair of indented holes 121, spaced apart equally about the mid point of the extent of the leveller bar 12 so as to be totally separated by the separation between the left and right vertical surface members 20, 21 of the base unit 11. Each leveller bar 12 is attached to the bottom of the base unit 11 by a pair of cap screws 122, each passing through the corresponding hole 121 in the corresponding leveller bar 12 to engage a corresponding hole formed in the corresponding left or right vertical surface member 20 or 21, such that the cap of each screw 122 is fully within the indentation of the corresponding cap screw hole 121 in the leveller bar 12. Each leveller bar 12 is further provided with an additional pair of threaded holes 123, disposed to pass, parallel to the cap screw holes 121, through the leveller bar 12, proximate to each end thereof. Each of the outwardly disposed holes 123 of the leveller bars 12 accepts an adjustable, generally cushioned, stand off leg element 124, the combination of the leg elements 124 serving as a base upon which the crystal cutting machine 10 is supported.

Figure 7:
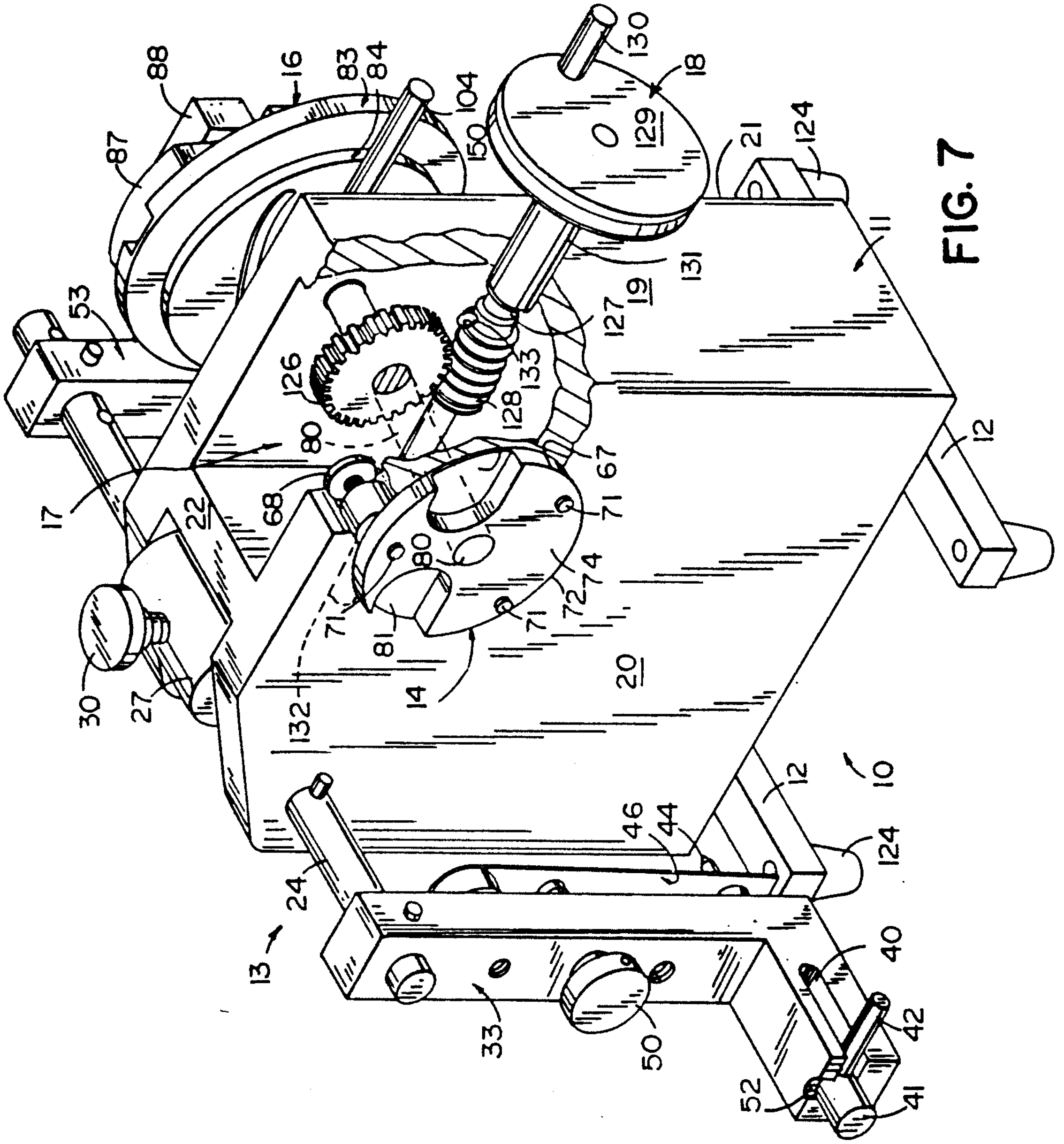
FIG. 7 is a partially broken away view, taken in the perspective of FIG. 1, showing a drive mechanism in accordance with the present invention.

Referring lastly to FIG. 7, in a partially broken away perspective view, the internal portion of the drive mechanism 17 and the external portion 18 of the drive mechanism of the crystal cutter 10 is illustrated to consist of the driven shaft 80, a driven gear 126, means for positionally securing the driven gear 126 to the driven shaft 80, a drive shaft 127 bearing a worm gear 128, a drive wheel 129, and a handle member 130. The driven shaft 80 is journalled to rotate about its longitudinal axis through a pair of holes 134, one through the left vertical surface member 20 and the other through the right vertical surface member 21, in mutual transverse registration, said driven shaft 80 extending outwardly from the sides of the base unit 11 to provide support for the crystal material holding assembly 14 and, on the obverse side of the base unit 11, the pattern holding assembly 16. The drive shaft 127 is journalled, to rotate about its longitudinal axis, between a hole 131 formed through the front vertical surface member 19 and a hole 132, in longitudinal registration with the hole 131, formed through the intermediate vertical structural strengthing member 22. The worm gear 128 is coupled to the drive shaft 127 by a sixth set screw 133 so as to be arranged, along with positioning of the driven shaft 80, the driven gear 126, and the drive shaft 127, to enable operable mating of the worm gear 128 with the driven gear 126. The drive shaft 127 has an extent outwardly of the front vertical surface member 19 to enable coupling the drive wheel 129 to the distal end of the drive shaft 127 by a seventh set screw (not shown) emplaced into a threaded hole (not shown) through a collar (not shown) attached to the drive wheel 129. The handle member 130 is coupled to the drive wheel 129, proximate to its maximum radius.

In use, an appropriately sized piece of mineral glass watch crystal material is placed in the crystal material holding assembly 14 by outwardly depressing the plunger 68, against the bias of the spring 69, to bring the third tapered stud 71 outward from the crystal clamp plate 67, allowing the mineral glass crystal material to be inserted against the first surface 74 of the plate element 72, whence the plunger 68 is released, allowing the third tapered stud 71 to move inwardly under the bias of the spring 69 so as to hold the mineral glass crystal material between the three tapered studs 71. A pattern is then placed into the pattern holding assembly 17 by using the radial handle 104 affixed to the clamp cam 84, acting against the bias of the clamp spring 86, rotating the clamp cam 84 relative to the clamp wheel 83, thereby causing the screws 113 to travel along the arcuate slots 103 in the clamp cam 84, causing the clamp guides 87, and the pattern clamp jaws 88 coupled thereto to separate, enabling the pattern to be placed between the open jaws 88. Release of the handle 104 allows the bias of the clamp spring 87 to rotate the clamp cam 84 with respect to the clamp wheel 83 such that the jaws 88 are closed to hold the pattern in place.

With the cutter arm 33 and the stylus arm 53 both hanging substantially vertically from the cutter/stylus shaft 24, under rotation of the cutter/stylus shaft 24 about its longitudinal axis under the influence of gravity acting on the distal ends of the cutter arm 33 and the stylus arm 53, with the cutter holding shaft 41 and the cutter bit 43 withdrawn from the cutter arm 33, against the bias of the leaf spring element 46, and the handle member 42 of the cutter holding shaft 41 seated in the short notch 52 in the distal end of the arm segment 38 of the cutter arm 33, and with the first thumbscrew 30 first loosened, the cutter/stylus shaft 24 translated longitudinally through the shaft spacer 27 toward the pattern holding assembly 16 side of the base unit 11, and with the first thumbscrew 30 then tightened to hold the cutter/stylus shaft 24 in said longitudinal position, the cutter/stylus shaft 24, along with the cutter arm 33 and the stylus arm 53 are rotated about the longitudinal axis of the cutter/stylus shaft 24 so that the stylus bit 59 is within the area of the pattern. The first thumbscrew 30 is then again loosened and the cutter/stylus shaft 24 is translated longitudinally and rotationally to bring the stylus bit 59 and the stylus point 60 into abutting contact with the pattern to be traced. The first thumbscrew 30 is then retightened against the flattened surface 28 of the cutter/stylus shaft 24. The handle member 42 of the cutter holding shaft 41 is then disengaged from the short notch 52 and allowed to translate inwardly, along with the cutter holding shaft 41, through the slot 40 along the arm segment 38 of the cutter arm 33, under the bias of the leaf spring element 46. The tension of the leaf spring member 46, and thus the pressure of the diamond point 44 upon the surface of the mineral glass crystal material, is then adjusted by the second thumbscrew 50. The drive wheel 129 is then rotated, using the handle member 130 until the entire outline of the pattern has been traced at least once.

Removal of the mineral glass crystal material and/or the pattern are accomplished in the appropriate reverse manner. When the mineral glass crystal material is removed from its holding assembly 14, the scribe marks placed on the mineral glass crystal material by the diamond point 44 serve as outlines for snapping off excess mineral glass crystal material.

While the above descriptions set forth the nature of the present invention, its manufacture, and its function, it may become obvious to those skilled in the art that alternate embodiments not specifically set forth herein may be envisioned. Such further variations are contemplated to be within the course and scope of the present invention, which shall be limited only by the claims set forth hereinbelow.

I claim:

1. A watch crystal material inscribing mechanism, comprising:

a base unit, having a width, an elevation, and a horizontal depth, providing structural support, from a substantially horizontal planar surface;

a driven shaft, extending through the width of the base unit and outwardly beyond the width of the base unit, said driven shaft being journalled through the base unit to enable driven rotation of the driven shaft about a longitudinal axis thereof;

means, supported by, and coupled to, a first end of the driven shaft so as to rotate therewith, for releasably clamping and holding an appropriately sized blank of planar mineral glass crystal material;

means, supported by, and coupled to, a second end of the driven shaft, obverse to said first end, so as to rotate with said driven shaft, for releasably clamping and holding a desired watch bezel pattern;

a cutter/stylus shaft, extending parallel to said driven shaft appropriately outwardly beyond the width of the base unit, said cutter/stylus shaft being journalled through the base unit to enable manual pivoting of the cutter/stylus shaft about a longitudinal axis thereof, said cutter/stylus shaft being further adapted to be translatable along its longitudinal axis between a plurality of lockable positions therealong;

means, supported by, and coupled to, a first end of the cutter/stylus shaft, on a same side of the base unit as the first end of the driven shaft, and extending perpendicularly from the cutter/stylus shaft for releasably holding a crystal material inscribing tool against the surface of the crystal material throughout inscription of a desired pattern;

means, support by, and coupled to, a second end of the cutter/stylus shaft, obverse to said first end thereof, for following the watch crystal bezel pattern, said means extending perpendicularly from the cutter/stylus shaft, parallel to said means for releasably holding an inscribing tool, said means for following the shape of the watch crystal bezel pattern extending from the cutter/stylus shaft through a distance enabling the entire bezel pattern to be followed by pivoting of the cutter/stylus shaft; and means for driving said driven shaft through at least one complete revolution.

2. The watch crystal material inscribing mechanism as claimed in claim 1, wherein said base unit comprises a structure including a front vertical surface member, a left vertical surface member, a right vertical surface member, and a central vertical structural strengthening member intermediate and interconnecting said left and right vertical surface members.

3. The watch crystal material inscribing mechanism as claimed in claim 2, further comprising means for supporting said base unit and for levelling the mechanism on an irregular surface.

4. The watch crystal material inscribing mechanism as claimed in claim 3, wherein said means for supporting said base unit and for leveling the mechanism comprises:

a pair of leveling bars each having first and second ends, affixed to an understructure of said base unit in a parallely spaced apart arrangement, and extending beyond the width of said base unit; and four levelling legs, each respectively depending from one end of each levelling bar for providing elevation adjustment, each leg having a resilient foot member.

5. The watch crystal inscribing mechanism as claimed in claim 4, wherein said means for releasably clamping and holding an appropriately sized blank of planar mineral glass crystal material comprises:

a crystal clamp plate and collar, formed substantially as a circular disk having an axial hole therethrough adapted to accept said driven shaft, said crystal clamp plate and collar being formed to include a collar portion axially disposed and affixed to a first planar surface of said disk, said collar portion including a threaded radial hole for a set screw used to lock the clamp plate and collar to one end of said driven shaft, a second planar surface of said disk, obverse to said first planar surface, is formed to have a pair of indented finger notches useful in mounting and removing the crystal material;

a spring and plunger housing, formed substantially as a right circular cylinder affixed to the first planar surface of said disk proximate to a radial periphery of said disk;

a compression spring, formed generally as a coil, housed within the spring and plunger housing;

a plunger, formed of a shaft passing through said compression spring and housing, and, perpendicularly to said first surface of said disk, slidably through a hole in said disk, said plunger including a finger button portion on an end thereof most removed from said first surface of said disk, an obverse end of said plunger being formed to include a stud portion, having an increasing diameter taper toward said obverse end; and a pair of tapered studs, each having an increasing diameter taper toward a first end thereof, said pair of tapered studs being rigidly affixed, at respective second ends thereof, to said second planar surface of said disk.

6. The watch crystal inscribing mechanism as claimed in claim 5, wherein said means for releasably clamping and holding a pattern comprises:

a clamp wheel, formed as a substantially planar circular disk having a collar flange affixed axially to a first surface of the disk, and a lesser diameter second collar fixed to said collar flange having an axial extent sufficient to accommodate a radially directed threaded hole for a set screw coupling said clamp wheel to said driven shaft proximate to an end of said shaft obverse to the end to which said means for releasably clamping said mineral glass crystal material is coupled, a second surface of said disk being formed to include a diametrically directed guide notch channel, with a pair of diametrically opposed slots through said disk, located centrally along said guide notch, each slot extending from proximate to said collar flange to proximate an outer edge of the disk;

a clamp cam, formed as a second circular disk having an axial hole therethrough adapted to freely rotate about said smaller diameter collar of said clamp wheel, said clamp cam including a pair of diametrically opposed arcuate cam slots formed therethrough, said clamp cam including a radially directed handle rigidly affixed to a first surface of said clamp cam, to extend radially outwardly from said clamp cam, said handle being useful for rotating said clamp cam about said driven shaft;

a clamp spring, formed as a coil having a central opening adapted to rotate about said first collar flange, said clamp spring including a first extension, directed axially with respect to the driven shaft, which engages with a stop member extending radially from the second collar of the clamp wheel, and a second extension, directed radially with respect to the driven shaft, which engages with the handle affixed to the clamp cam, the coil spring being placed into compression by appropriate circumferential motion of the handle, the coil spring providing a bias force to clamp and hold the pattern;

a pair of clamp guides, each having a linear flange formed thereon adapted to translate linearly along a corresponding portion of diametrically directed guide notch channel of the clamp wheel, each clamp guide being provided with a substantially centrally mounted screw engaging said clamp guide and extending, in the direction of the driven shaft, through a corresponding diametrically opposed slot through the clamp wheel, and through a corresponding diametrically opposed arcuate slot through the clamp cam; and a pair of opposed pattern clamp jaws, each respectively coupled to a corresponding clamp guide.

7. The watch crystal inscribing mechanism as claimed in claim 6, wherein said means for following the pattern of a desired watch crystal bezel comprises:

a stylus arm, depending from, and coupled to an end of said cutter/stylus shaft corresponding to the end of the driven shaft supporting the pattern holding assembly, so as to rotate about the longitudinal axis of the cutter/stylus shaft as the cutter/stylus shaft is so pivoted, said stylus arm having an extent to appropriately span a distance between the axis of the cutter/stylus shaft and the pattern held by the pattern holding assembly;

a stylus bit, affixed through a hole through a distal end of the stylus arm so as to be parallel with the longitudinal axes of both the driven shaft and the cutter/stylus shaft; and a stylus point, extending colinearly with said stylus bit to engage with the pattern to be followed.

8. The watch crystal inscribing mechanism as claimed in claim 7, wherein said stylus arm further comprises:

a diagonal slot formed through said stylus arm in the direction parallel to said shafts, said slot being constrained to preclude separation of the stylus arm into two segments; and means for expanding or contracting the width of said slot so as to adjust the positioning of said stylus relative to said cutter/stylus shaft.

9. The watch crystal inscribing mechanism as claimed in claim 8, wherein said means for releasably holding an inscribing tool comprises:

a cutter arm, formed as an L-shaped element having a leg segment, depending from an end of said cutter/stylus shaft opposed to the end of said shaft supporting said stylus arm, said leg segment being coupled to said cutter/stylus shaft by a set screw such that said stylus arm and said leg segment extend in a direction perpendicular to said cutter/stylus shaft, with an arm segment of said cutter arm extending outwardly from the base unit so as to be parallel with the longitudinal axes of the cutter/stylus shaft and the driven shaft, said arm segment being formed to have a central hole completely therethrough, with a longitudinal slot formed therealong from a distal end of the arm segment to a point proximate to the juncture of said arm segment to said leg segment;

a cutter bit, adapted to slide longitudinally through the hole formed in said arm segment;

a cutter point, colinearly extending from said cutter bit toward said mineral glass crystal material;

a handle member, coupled to said cutter bit, proximate to a distal end of said arm segment, said handle member being adapted to translate along said longitudinal slot in said arm segment, said handle member engaging with a notch formed on the distal end of the arm segment, said notch being disposed at substantially 90 degrees of angle with respect to a longitudinal axis of the cutter bit; and a leaf spring element, coupled to the leg segment of the cutter arm in a manner engaging the cutter bit so as to bias the cutter point toward said crystal material surface when the handle member is oriented so as to be capable of translating along said slot in said arm segment of said cutter arm.

10. The watch crystal inscribing mechanism as claimed in claim 9, wherein the cutter arm further comprises means for adjusting the tension on the leaf spring to adjust the scribing pressure of the cutter point onto the surface of the mineral glass watch crystal material.

11. The watch crystal inscribing mechanism as claimed in claim 10, wherein said means for driving the driven shaft comprises:

a toothed gear coupled to, so as to rotate with, the driven shaft, said gear being positioned substantially centrally within said base unit between left and right side members thereof;

a drive shaft, journalled through the front vertical surface member and to the intermediate vertical structural strengthening member of the base unit so as to be capable of rotating about its longitudinal axis;

a worm gear, coupled to said drive shaft so as to rotate therewith about the longitudinal axis of the drive shaft, said drive shaft and said worm gear being disposed such that said worm gear operably engages said toothed gear carried by said driven shaft;

a drive wheel, formed substantially as a planar circular disk affixed axially, by a set screw, to a distal end of said drive shaft, outwardly of the base unit so as to transmit rotation of said drive wheel to said drive shaft; and a handle member, coupled to said drive wheel, proximate to a radial periphery of said drive wheel, said handle member extending outwardly from said base unit to assist in rotating said drive wheel.

12. The watch crystal inscribing mechanism as claimed in claim 10, wherein said means for driving the driven shaft comprises:

a toothed gear coupled to, so as to rotate with the drive shaft, said gear being positioned substantially centrally within said base unit between left and right side members thereof;

a drive shaft, journalled through the front vertical surface member and to the intermediate vertical structural strengthening member of the base unit so as to be capable of rotating about a longitudinal axis of said drive shaft;

a worm gear, coupled to said drive shaft so as to rotate therewith about the longitudinal axis of the drive shaft, said drive shaft and said worm gear being disposed such that said worm gear operably engages said toothed gear carried by said driven shaft;

an electric motor, coupled to said drive shaft so as to rotate said drive shaft about its longitudinal axis relative to said base unit.

13. A watch crystal material inscribing mechanism, comprising:

a base unit;

a driven shaft journalled through the base unit to enable driven rotation of the driven shaft about a longitudinal axis thereof;

means coupled to a first end of the driven shaft for releasably clamping and holding a blank of mineral glass crystal material;

means coupled to a second end of the driven shaft for releasably clamping and holding a watch bezel pattern;

a second shaft journalled through the base unit parallel to said driven shaft to enable manual pivoting of the second shaft about a longitudinal axis thereof, said second shaft further adapted to be translatable along its longitudinal axis between a plurality of lockable positions therealong;

means coupled to a first end of the second shaft for releasable holding a crystal material inscribing tool against the crystal material throughout inscription of a desired pattern;

means coupled to a second end of the second shaft for following said watch bezel pattern; and means for driving said driven shaft through at least one complete revolution.

14. The inscribing mechanism as claimed in claim 13, wherein said base unit comprises a front vertical surface member, a left vertical surface member, a right vertical surface member, and a rear vertical structural strengthening member, each interconnected to provide a framed structure.

15. The inscribing mechanism as claimed in claim 14 further comprising means for levelling the mechanism on an irregular surface.

16. The inscribing mechanism as claimed in claim 15, wherein said means for levelling the mechanism comprises:

a pair of levelling bars, affixed to an understructure of said base unit in a parallel spaced apart arrangement; and at least one levelling leg depending from each levelling bar for providing elevation adjustment.

17. The inscribing mechanism as claimed in claim 14, wherein said means for releasably clamping and holding a blank of mineral glass crystal material comprises:

a crystal clamp plate having an axial hole therethrough adapted to accept said driven shaft, a collar portion axially disposed and affixed to a first planar surface of said clamp plate, said collar portion attaching the clamp plate to an end of said driven shaft, a second planar surface of said clamp plate having a pair of indented finger notches useful in mounting and removing said mineral glass crystal material;

a plunger housing affixed to the first planar surface of said clamp plate proximate to a peripheral edge of said clamp plate;

a spring housed within the plunger housing;

a plunger passing concentrically through said spring and housing and perpendicularly to said first surface of said disk; and a pair of studs rigidly affixed to said second planar surface of said clamp plate proximate to the periphery of said clamp plate and distant from said plunger.

18. The inscribing mechanism as claimed in claim 14, wherein said means for releasably clamping and holding a watch bezel pattern comprises:

a substantially planar disk having a collar affixed axially to a first surface of the disk, said collar forming a first collar flange adjacent said first surface of said disk, and a lesser diameter second collar coupled to an end of said driven shaft opposite the end to which said means for releasably clamping and holding said blank of mineral glass crystal material is coupled, said disk further including a diametrically directed guide notch channel with a pair of diametrically opposed slots through said disk;

a clamp cam, having an axial hole therethrough adapted to freely rotate about said lesser diameter second collar of said clamp wheel, and including a pair of diametrically opposed arcuate cam slots formed therethrough, a radially directed handle rigidly affixed to a first surface of said clamp cam to extend radially outwardly from said clamp cam, said handle being useful for rotating said clamp cam about said driven shaft;

a clamp spring including a first extension, directed axially with respect to the driven shaft, which engages with a stop member extending radially from the clamp wheel, and a second extension, directed radially with respect to the driven shaft, which engages with the handle affixed to the clamp cam, the coil spring being placed into compression by appropriate circumferential motion of the handle, the coil spring providing a bias force to clamp and hold the pattern;

a pair of clamp guides, each having a linear flange formed thereon adapted to translate linearly along a corresponding portion of the diametrically directed guide notch channel of the clamp wheel, each clamp guide being provided with a substantially centrally mounted screw engaging said clamp guide and extending, in the direction of the driven shaft, through a corresponding diametrically opposed slot through the clamp wheel, and through a corresponding diametrically opposed arcuate slot through the clamp cam; and a pair of opposed pattern clamp jaws, each respectively coupled to a corresponding clamp guide.

19. The inscribing mechanism as claimed in claim 14, wherein said means for following the watch bezel pattern comprises:

a stylus arm, depending from, and coupled to an end of said second shaft;

a stylus bit, affixed in a hole through an end of the stylus arm so as to be parallel with the longitudinal axes of both the driven shaft and the second shaft; and a stylus point, extending colinearly with said stylus bit to engage the pattern to be followed.

20. A mechanism for inscribing a blank of mineral glass crystal material used for a watch bezel, comprising in combination:

a base including levelling means for providing elevation adjustment to said base;

a first shaft extending through said base and journalled therein for rotation about a longitudinal axis of said first shaft;

a first clamp attached to one end of said first shaft for releasably retaining the blank of mineral glass crystal material;

a second clamp attached to an opposite end of said first shaft for releasably retaining a pattern;

a second shaft extending through said base generally parallel to said first shaft, and journalled therein for rotation about a longitudinal axis of said second shaft;

an inscribing tool coupled to one end of said second shaft on a same side of said base as said first clamp and adapted to engage said inscribing tool against the blank of mineral glass crystal material;

a stylus coupled to an opposite end of said second shaft on a same side of said base as said second clamp for following said pattern; and a transmission for driving said first shaft through at least one complete rotation while said stylus follows said pattern and said inscribing tool engages the blank of mineral glass crystal material.

* * * * *

UNITED STATES PATENT AND TRADEMARK OFFICE

CERTIFICATE OF CORRECTION

PATENT NO. : 5,325,840

DATED : July 5, 1994

INVENTOR(S) : Henry V. Schohl

It is certified that error appears in the above-indentified patent and that said Letters Patent is hereby corrected as shown below:

Col. 1, line 43;
"such the" should be --such that--.

Col. 7, line 36;
"observe" should be --obverse--.

Col. 9, line 40;
After "cam 84" delete --is--.

Col. 13, line 11;
"support" should be --supported--.

Col. 17, line 2;
"releasable" should be --releasably--.

Signed and Sealed this

Tenth Day of January, 1995

Attest:

BRUCE LEHMAN

*Attesting Officer*

*Commissioner of Patents and Trademarks*